(12) United States Patent
Wong et al.

(10) Patent No.: US 11,375,467 B2
(45) Date of Patent: Jun. 28, 2022

(54) INFRASTRUCTURE EQUIPMENT, WIRELESS COMMUNICATIONS SYSTEM, COMMUNICATIONS DEVICE AND METHODS

(71) Applicant: Sony Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/760,047

(22) PCT Filed: Nov. 14, 2018

(86) PCT No.: PCT/EP2018/081246
§ 371 (c)(1),
(2) Date: Apr. 29, 2020

(87) PCT Pub. No.: WO2019/096855
PCT Pub. Date: May 23, 2019

(65) Prior Publication Data
US 2020/0351807 A1     Nov. 5, 2020

(30) Foreign Application Priority Data
Nov. 14, 2017   (EP) .................................... 17201748

(51) Int. Cl.
*H04W 56/00* (2009.01)
*H04W 52/02* (2009.01)
*H04W 68/00* (2009.01)

(52) U.S. Cl.
CPC ... *H04W 56/0015* (2013.01); *H04W 52/0235* (2013.01); *H04W 68/005* (2013.01)

(58) Field of Classification Search
None
See application file for complete search history.

(56) References Cited

U.S. PATENT DOCUMENTS 10,813,079 B2 * 10/2020 Liu .................... H04B 7/0695
2011/0103288 A1   5/2011 Lee et al.
(Continued)

FOREIGN PATENT DOCUMENTS

| WO | 2014/176781 A1 | 11/2014 |
| WO | 2018/202718 A1 | 11/2018 |
| WO | 2019/030337 A1 | 2/2019 |

OTHER PUBLICATIONS

International Search Report and Written Opinion dated Jan. 31, 2019 for PCT/EP2018/081246 filed on Nov. 14, 2018, 11 pages.
(Continued)

*Primary Examiner* — Gregory B Sefcheck
*Assistant Examiner* — Amarnauth G Persaud
(74) *Attorney, Agent, or Firm* — Xsensus LLP

(57) ABSTRACT

An infrastructure equipment for use in a wireless communications system comprising the infrastructure equipment and one or more communications devices is provided. The infrastructure equipment comprises controller circuitry and transceiver circuitry which are configured in combination to broadcast one or more synchronisation signals for use by the one or more communications devices to achieve synchronisation with a cell provided by the infrastructure equipment, and to broadcast an additional synchronisation signal, the additional synchronisation signal including an indication of a status of a first communications parameter selected from a plurality of communications parameters in accordance with conditions determined by the controller circuitry.

16 Claims, 6 Drawing Sheets

(56) References Cited

U.S. PATENT DOCUMENTS

| | | | |
|---|---|---|---|
| 2013/0321042 A1* | 12/2013 | Xu | H04W 56/00 |
| | | | 327/141 |
| 2016/0270013 A1* | 9/2016 | Soriaga | H04L 1/0047 |
| 2018/0234918 A1* | 8/2018 | Asterjadhi | H04W 56/001 |
| 2019/0334651 A1* | 10/2019 | Ji | H04J 13/10 |
| 2019/0364489 A1* | 11/2019 | Liberg | H04W 48/12 |
| 2020/0252890 A1* | 8/2020 | Irukulapati | H04W 72/005 |
| 2020/0267670 A1* | 8/2020 | Strom | H04W 48/10 |

OTHER PUBLICATIONS

Harri Holma and Antti Toskala, "LTE for UMTS—OFDMA and SC-FDMA Based Radio Access," ISBN 978-0-470-74547-2, Apr. 2009, pp. 25-27.

Huawei At El., "New WID on Further NB-IoT enhancements", 3GPP TSG RAN Meeting #75, RP-170852, Dubrovnik, Croatia, Mar. 6-9, 2017, 6 pages.

Ericsson and Qualcomm, "New WID on Even further enhanced MTC for LTE," 3GPP TSG RAN Meeting #75, RP-170732, revision of RP-170465, Dubrovnik, Croatia, Mar. 6-9, 2017, 4 pages.

Huawei and Hisilicon, "Revised work item proposal: Enhancements of NB-IoT", 3GPP TSG RAN Meeting #73, RP-161901, revision of RP-161324,New Orleans, USA, Sep. 19-22, 2016, 8 pages.

Ericsson, "Revised WID for Further Enhanced MTC for LTE," 3GPP TSG RAN Meeting #73, RP-161464, revision of RP-161321, New Orleans, USA, Sep. 19-22, 2016, 6 pages.

Ericsson, "Reduced system acquisition time for MTC," 3GPP TSG-RAN WG1 Meeting #90bis, R1-1716995, Prague, Czech Republic, Oct. 9-13, 2017, pp. 1-7.

White Paper, "Coverage Analysis of LTE-M Category-M1," Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2017, pp. 1-20.

\* cited by examiner

INFRASTRUCTURE EQUIPMENT, WIRELESS COMMUNICATIONS SYSTEM, COMMUNICATIONS DEVICE AND METHODS

CROSS-REFERENCE TO RELATED APPLICATIONS

The present application is based on PCT filing PCT/EP2018/081246, filed Nov. 14, 2018, which claims priority to EP 17201748.5, filed Nov. 14, 2017, the entire contents of each are incorporated herein by reference.

BACKGROUND

Field of Disclosure

The present disclosure relates to infrastructure equipment and communications devices of wireless communications systems, where infrastructure equipment are configured to indicate a status of a communications parameter to communications devices using an additional synchronisation signal.

The present application claims the Paris convention priority of European patent application EP17201748.5 the contents of which are incorporated herein by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently, there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide an infrastructure equipment for use in a wireless communications system comprising the infrastructure equipment and one or more communications devices. The infrastructure equipment comprises controller circuitry and transceiver circuitry which are configured in combination to broadcast one or more synchronisation signals for use by the one or more communications devices to achieve synchronisation with a cell provided by the infrastructure equipment, and to broadcast an additional synchronisation signal, the additional synchronisation signal including an indication of a status of a first communications parameter selected from a plurality of communications parameters in accordance with conditions determined by the controller circuitry.

Embodiments of the present technique, which further relate to wireless communications systems, communications devices, methods of operating communications devices and infrastructure equipment and circuitry for communications devices and infrastructure equipment, allow for an additional synchronisation signal (MSS) to be broadcast by the infrastructure equipment, which can be used to provide a plurality of indications whilst minimising the number of information bits required.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Wireless Communications System

Figure 1:
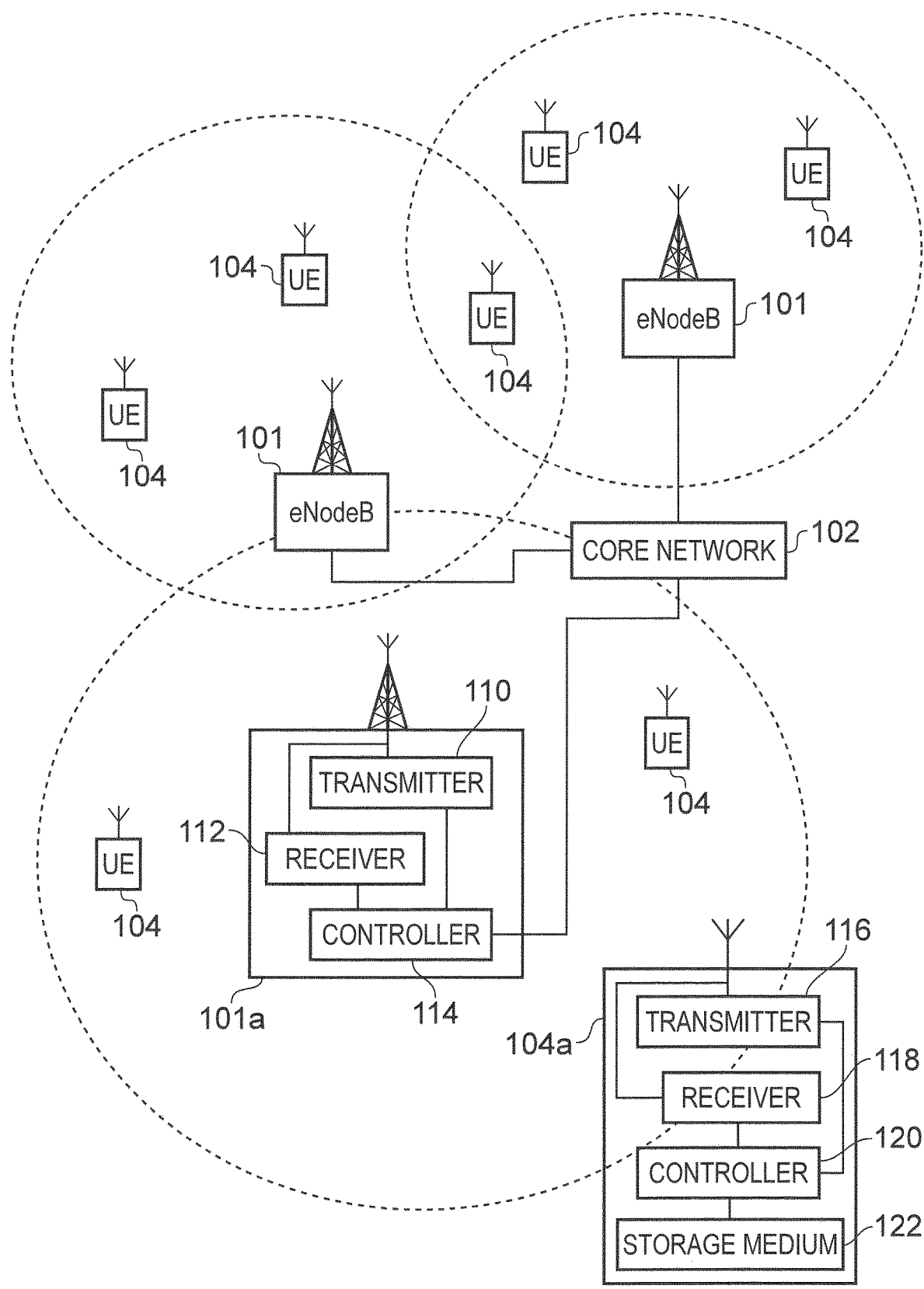
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [5]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface.

The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) standard. As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

In this example, the infrastructure equipment 101a comprises a transmitter 110 for transmission of wireless signals, a receiver 112 for reception of wireless signals and a controller 114 configured to control infrastructure equipment 1001a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 104 may provide the scheduling function for the base station.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The UE 104a also comprises a storage medium 122, such as a solid state memory or similar, for storing data. The transmitter 116, receiver 118 and storage medium 112 are controlled by a controller 120. In the embodiments of the present disclosure, the UE 104a is a terminal device configured to operate using feMTC (Further Enhanced Machine Type Communications) or eNB-IoT (Enhanced Narrowband Internet of Things).

In this example, the terminal device 104a comprises a transmitter 116 for transmission of wireless signals, a receiver 118 for reception of wireless signals, a controller 120 configured to control the terminal device 104a and a storage medium 122. The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 104a will in general comprise various other elements associated with its operating functionality, for example a power source, user interface, and so forth, but these are not shown in FIG. 1 in the interests of simplicity.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIG. 2.

Figure 2:
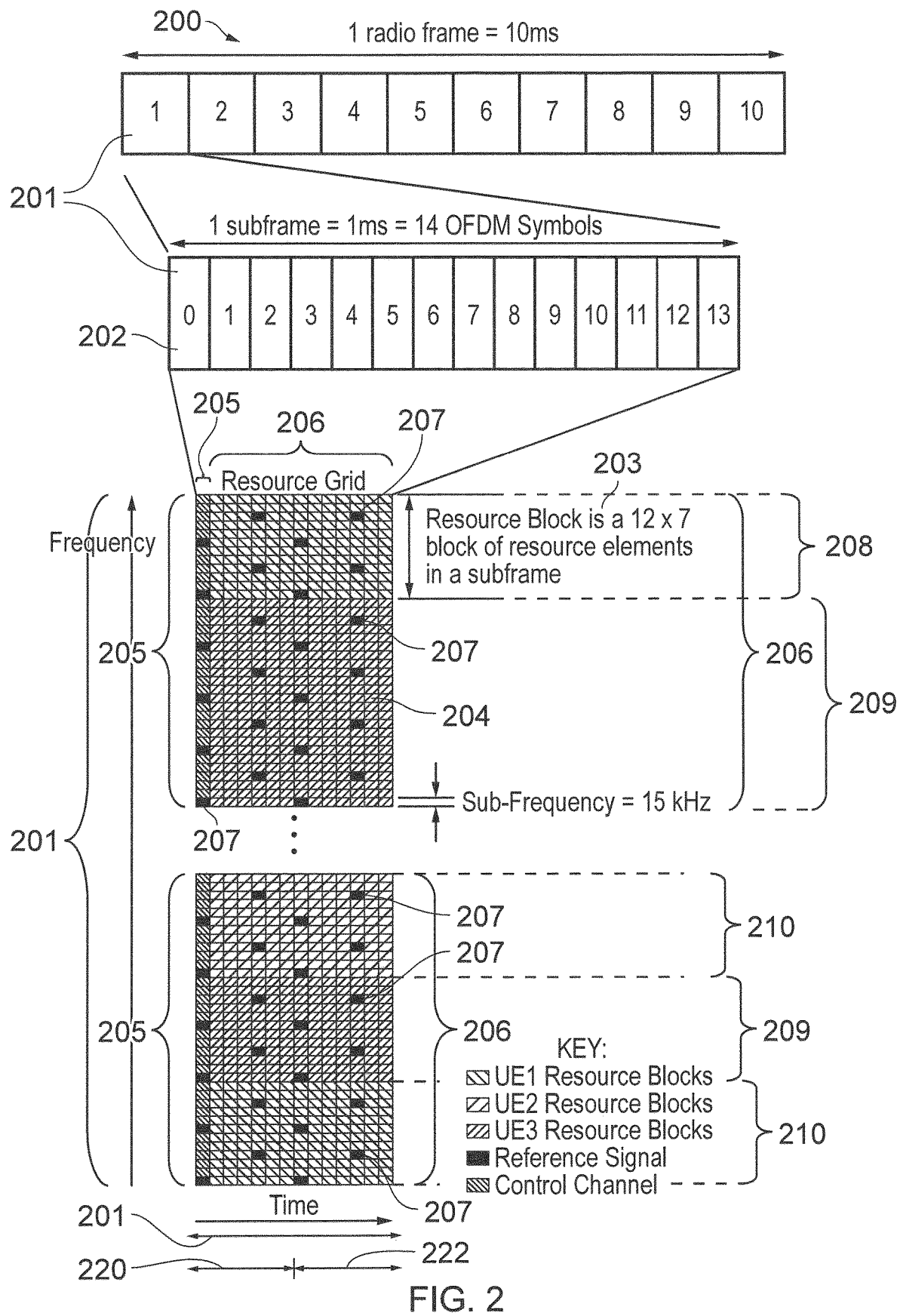
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into orthogonal subcarriers. Not all of these subcarriers are used to transmit data. The number of subcarriers varies between 72 subcarriers (1.4 MHz) and 1200 subcarriers (20 MHz). In some examples the subcarriers are grouped to form a scheduling blocks. A resource block (RB) can consist of 12 sub-carriers. A narrowband in MTC can consist of 6 RBs or 72 subcarriers. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The frame structure also contains primary synchronisation signals (PSS) and secondary synchronisation signals (SSS): not shown in FIG. 2. The PSS occupies the central 62 subcarriers of the $7^{th}$ OFDM symbol of the first subframe and the $7^{th}$ OFDM symbol of the $6^{th}$ subframe of the radio frame. The SSS occupies the central 62 subcarriers of the $6^{th}$ OFDM symbol of the first subframe and the central 62 subcarriers of the $6^{th}$ OFDM symbol of the $6^{th}$ subframe of the radio frame.

Before a terminal can use a cell provided by a base station, the terminal is expected to carry out a series of steps. For example, a terminal may be in a situation where it has not yet achieved synchronisation after a long DRX period or after having being switched on. A terminal would be expected to detect the cell and cell-ID using the Primary Synchronisation Signal (PSS) and Secondary Synchronisation Signal (SSS) to detect the cell, and then receive the System Information (MIB) from the Physical Broadcast Channel (PBCH) and further System Information from the PDSCH. More specifically a terminal would have to first achieve time and frequency synchronisation with the cell, typically using the legacy PSS and SSS emitted by the base station. Then, the terminal will decode the PBCH to acquire the MIB. In eMTC, the MIB contains amongst other things information for the terminal to acquire further System Information, namely SIB1-BR that is transmitted via the PDSCH. SIB1-BR contains scheduling information for acquiring the remaining System Information portions (other SIBs).

As described above, it is expected future wireless communications networks will be expected to efficiently support communications with devices including reduced complexity devices or machine type communication (MTC) devices, which may be deployed for supporting the "The Internet of Things", and may typically be associated with the transmissions of relatively small amounts of data with relatively high latency tolerance.

One application of MTC is to provide periodic reports, e.g. sensors, utility meters, where the reports or readings are transmitted infrequently, e.g. once every several hours or days. Hence, in order to save battery power, such devices likely operate mostly in idle mode where they operate with long DRX cycles. When a MTC UE is put into long DRX it will lose synchronisation with the network and hence upon waking up from DRX (e.g. to monitor the Paging Occasion or perform a RACH), the UE needs to re-synchronise to the network and perform system acquisition (read the MIB and SIB). In the legacy system, the UE uses the legacy LTE PSS (Primary Synchronization Signal) and SSS (Secondary Synchronization Signal) to achieve synchronisation and thereafter, the UE acquires the PBCH and then SIB1-BR. For a UE operating in coverage enhanced mode, these re-synchronisation and system acquisition operations are notoriously slow as numerous repetitions are required to be able to decode the PBCH and PDSCH channels carrying the System Information. Example estimates of the expected acquisition times for the PSS/SSS, PBCH (MIB) and SIB1 are shown in Table 1, which is reproduced from [6], for a deep coverage scenario (e.g. a coverage with a maximum coupling loss (MCL) of 164 dB).

TABLE 1

Estimated 90% acquisition time at 164 dB MCL

| Channel | 90% Acquisition Time (ms) at 164 dB MCL |
| --- | --- |
| PSS/SSS | 850 |
| PBCH (MIB) | 250 |
| PDSCH (SIB1-BR) | 750 |

Table 1 shows the 90-th percentile of the time required to detect each signal. As can be seen in this table, a significant amount of time and energy needs to be spent on system information acquisition in the deep coverage scenario, once synchronisation has been achieved. It can thus be desirable to try to reduce or eliminate the time and/or power used for system acquisition, that is for acquiring the MIB and SIBs (using the current terminology).

Figure 3:
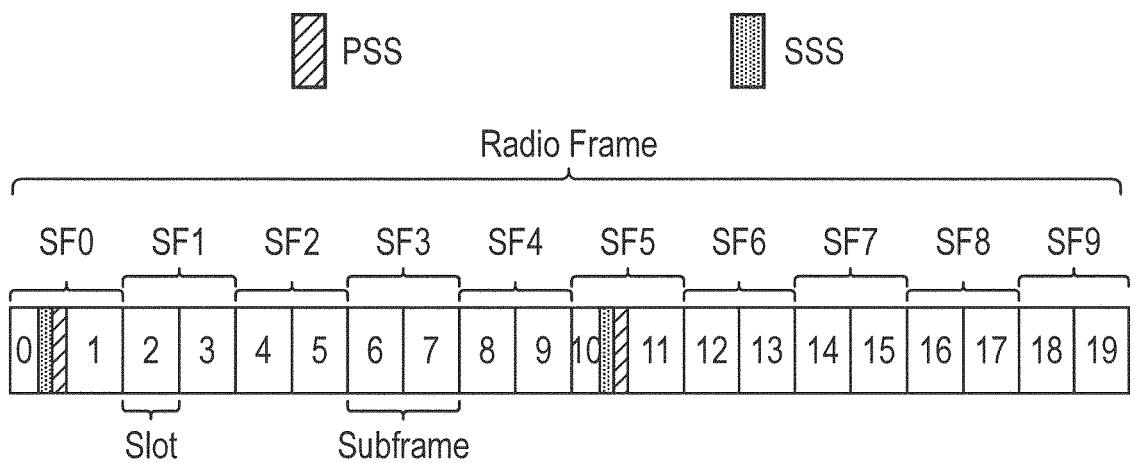
FIG. 3 schematically represents the transmission of the synchronisation signals in an FDD LTE system.

Legacy terminals (MTC terminals or otherwise) use the existing PSS/SSS which occupy only 1 OFDM symbol each and are transmitted sparsely; twice every radio frame. This is illustrated in FIG. 3 which represents the transmission of the synchronisation signals in an FDD LTE system, where it can be seen that the PSS and SSS each occupy a single OFDM symbol every 5 ms, where a radio frame is 10 ms. Here the PSS is transmitted in the last OFDM symbol of Slot 0 (Subframe 0) and Slot 10 (Subframe 5) whilst the SSS is transmitted in the second to last OFDM symbol of Slot 0 (Subframe 0) and Slot 10 (Subframe 5). Hence, additional synchronisation signals for MTC (MSS) are proposed for efeMTC to increase the density of available synchronisation signals so that the MTC UE can use them to shorten its time to re-synchronise to the network.

Figure 4:
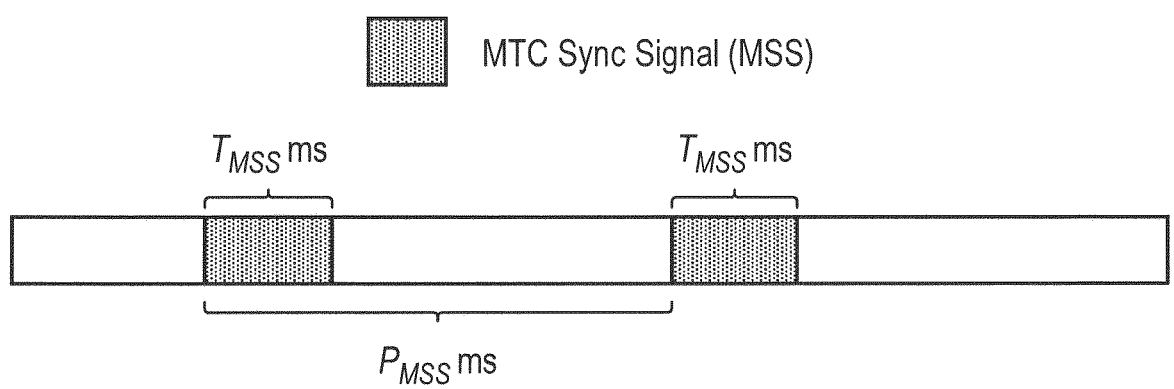
FIG. 4 illustrates an example of how additional synchronisation signals (MSS) can be intermittently transmitted.

The MSS can be transmitted in a burst-like manner, i.e. it is transmitted densely for $T_{MSS}$ ms every $P_{MSS}$ ms [7], for example $T_{MSS}$ can be 10 to 20 ms and $P_{MSS}$ can be 100 ms to 3 seconds. The burst interval $T_{MSS}$ and periodicity $P_{MSS}$ is configurable thereby allowing the eNodeB to control the percentage of resources used for MSS. This is shown in FIG. 4.

In co-pending European patent application no. EP17169821 [8], the contents of which are hereby incorporated by reference, it is proposed that the MSS provides a system information (SI) change indication. That is, the MSS indicates whether the MIB and SIBs have changed and if they have not changed, the MTC UE can skip reading the MIB and SIBs which would save a significant amount of time and energy. Embodiments of the present technique also recognise that MIB and SIBs changes rarely occur and hence for the majority of the time the MTC UE will not need to re-acquire MIB and SIBs.

In [7] it is further proposed that the MSS also indicates Access Barring and possibly other indications. It should be noted that the MSS is a preamble sequence and hence it cannot carry too many information bits since that would reduce the reliability of the MSS, or to maintain the reliability it would be necessary to increase the number of repetitions i.e. the burst time $T_{MSS}$ of the MSS.

Therefore, a technical problem to solve is how to enable the MSS to provide a plurality of indications whilst minimising the number of information bits required. Embodiments of the present technique provide solutions to this technical problem.

Configurable Indicator in Synchronisation Signal

Figure 5:
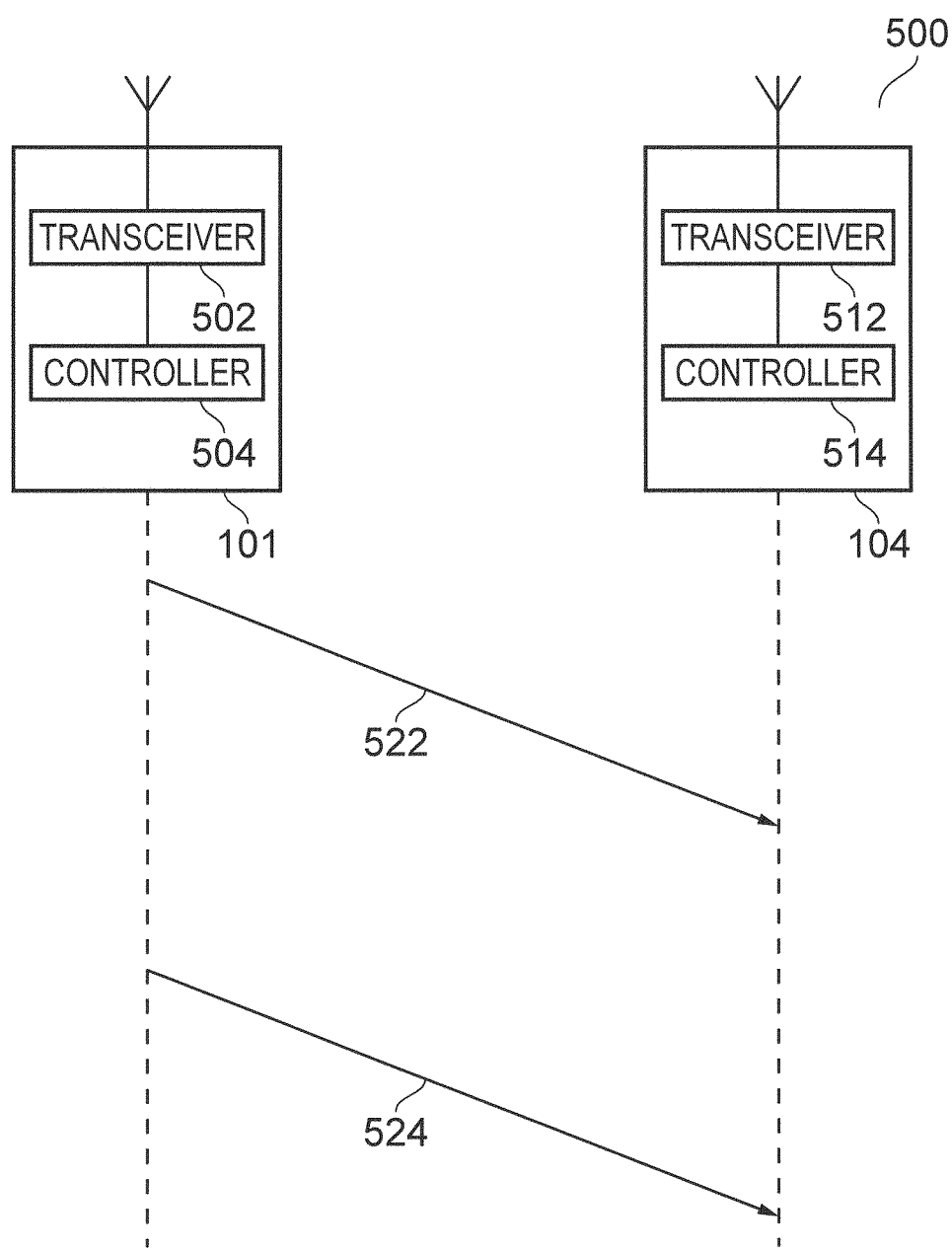
FIG. 5 shows a part schematic, part message flow diagram of communications in a wireless communications system in accordance with embodiments of the present technique.

FIG. 5 shows a part schematic, part message flow diagram of communications in a wireless communications system 500 in accordance with embodiments of the present technique. The wireless communications system 500 comprises an infrastructure equipment 101 and one or more communications devices 104, wherein each of the infrastructure equipment 101 and communications device 104 comprises controller circuitry 504, 514 and transceiver circuitry 502, 512. The controller circuitry 504 and transceiver circuitry 502 of the infrastructure equipment 101 are configured in combination to broadcast 522 one or more synchronisation signals for use by the one or more communications devices 104 to achieve synchronisation with a cell provided by the infrastructure equipment 101, and to broadcast 524 an additional synchronisation signal, the additional synchronisation signal including an indication of a status of a first communications parameter selected from a plurality of communications parameters in accordance with conditions determined by the controller circuitry.

Each of the controllers 504, 514 may be, for example, a microprocessor, a CPU, or a dedicated chipset, etc. It will be appreciated by those skilled in the art that, in arrangements of the present technique, the transceiver 512 of the communications device 104 may not always include a transmitter, for example in scenarios where the communications device 512 is a low-power wearable device.

The conditions determined by the infrastructure equipment 101 in selecting the communications parameter whose status to be indicated by the additional synchronisation signal may be that the communications parameter is fixed in the specifications and known to the infrastructure equipment 101, or the particular communications parameter may be something which the infrastructure equipment 101 can decide on or choose itself and is configurable. Embodiments of the present technique discussed in the following paragraphs provide more detail on these possibilities, including, but not limited to, an MSS being able to indicate more than one of the communications parameters at a time, multiple MSS being broadcast, and that each of these might contain a mixture of fixed and configurable communications parameters.

Embodiments of the present technique allow the network to configure a subset of indicators from a plurality of indicators that can be carried by the MSS information bit(s). For example, the plurality of indicators include MIB/SI change, Access Barring & Active PTW (where "active PTW" indicates that a paging time window is active, i.e. relevant UEs should wake up to monitor the PTW). The MSS can carry only 1 bit of information and so this invention allows the eNB to configure this 1 bit of information to indicate either MIB/SI change, Access Barring or Active PTW. This recognises that not all indications are required at the same time and hence allows the network the flexibility to decide which indicator to use and minimises the number of information bits required of the MSS. In other words, the status of the first or the others of the plurality of communications parameters includes one or more of an indication of a change in system information for the cell provided by the infrastructure equipment, an indication of whether a paging time window comprising a one or more paging occasions during which the one or more communications devices may be paged by the infrastructure equipment is active, and an indication of whether access for the one or more communications is currently barred for the cell.

Embodiments of the present technique can also be applied to the case where the MSS can carry more than one bit of information, but the number of bits of information that it can transmit is still limited (i.e. the invention is also applicable to the case where the MSS can transmit M bits of information and there are N potential bits of information, M<N). In other words, the additional synchronisation signal comprises one or more bits, wherein the one or more bits are fewer than a number of bits required to indicate the status of all of the plurality of communications parameters.

Figure 6:
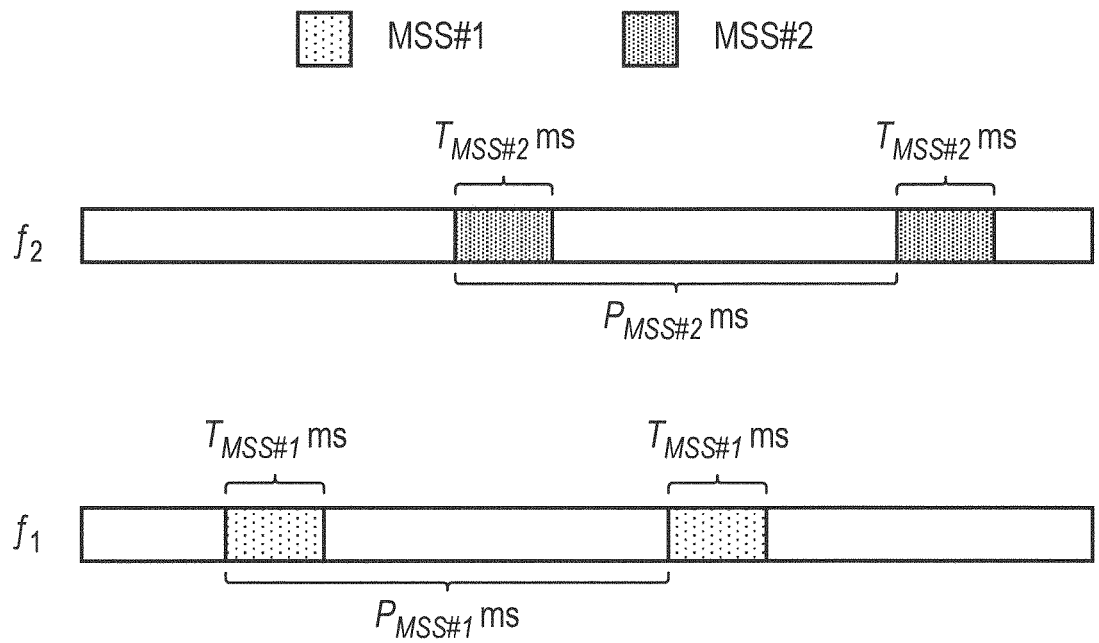
FIG. 6 illustrates an example of how two MSS can be configured to indicate different things in accordance with embodiments of the present technique.

In some embodiments of the present technique, multiple MSS are transmitted and each MSS can be configured to indicate a different indicator. For example two MSS, MSS #1 and MSS #2 can be configured with different lengths ($T_{MSS\#}1$ and $T_{MSS\#}2$) and periodicity ($P_{MSS\#}1$ and $P_{MSS\#}2$) as shown in FIG. 6, where MMS #1 can indicate whether MIB/SI has changed and MMS #2 can indicate whether the cell (or a specific narrowband) is barred from access. These MSS are configured in different narrowbands at frequency $f_1$ and $f_2$ for MSS #1 and MSS #2 respectively and they are staggered in time allowing a UE to read both MSS. These MSS can of course be configured in the same narrowband. It should be appreciated that although in this example each MSS carries only one information bit, the invention also applies for MSS that carry more than one information bit. In other words, in these embodiments, the controller circuitry of the infrastructure equipment and transceiver circuitry of the infrastructure equipment are configured in combination to broadcast one or more other additional synchronisation signals providing an indication of the status of one or more other communications parameters selected from the plurality of communications parameters in accordance with conditions determined by the controller circuitry. In some arrangements, the additional synchronisation signal is broadcast for a different amount of time than the one or more other additional synchronisation signals. In other arrangements, the additional synchronisation signal is broadcast with a different periodicity to the one or more other additional synchronisation signals. In some arrangements, the additional synchronisation signal is broadcast in a different narrowband of a wireless access interface provided by the infrastructure equipment to a narrowband in which the one or more other additional synchronisation signals are broadcast.

In these embodiments of the present technique, it should also be appreciated that a UE can be configured to monitor more than one MSS and a different UE can be configured to monitor a different set of MSS, e.g. MSS #1 can indicate whether MIB/SIB1-BR have changed and MSS #2 indicates access class barring status: in this case UE1 can be configured to monitor MSS #1 and MSS #2 whilst UE2 can be configured to monitor only MSS #1 (e.g. UE2 serves a critical application that is not subject to access class barring, whereas UE1 is subject to access class barring). In other words, the additional synchronisation signal is for monitoring by a subset of the one or more communications devices.

It should be appreciated that the MSS described in these embodiments of the present technique can convey a different number of bits. For example MSS #1 may convey a single bit (e.g. where the single bit indicates whether MIB/SIB1-BR have changed) and MSS #2 might convey two bits (e.g. where the two bits indicate access barring status for two access barring classes). In other words, in these embodiments, the additional synchronisation signal comprises a different number of bits than the one or more other additional synchronisation signals.

In some embodiments of the present technique, for MSS that carries more than one information bit, some of these bits are configurable and the remaining ones are fixed. For example an MSS can carry 2 information bits where 1 information bit indicates whether MIB/SI has changed and the other information bit can be configured to indicate either Access Barring or whether a PTW is active or not. In other words, in these embodiments, the additional synchronisation signal comprises a plurality of bits, a first portion of the plurality of bits being fixed to indicate the status of a first of the plurality of communications parameters, and a second portion of the plurality of bits being configurable by the infrastructure equipment to indicate the status of one or more others of the plurality of communications parameters.

In some embodiments of the present technique, the MSS has a default indication unless it is configured to indicate other things. For example, an MSS has 1 information bit and by default would indicate whether MIB/SI has changed. In the absence of any configuration, the UE would interpret the MSS as per the default indication unless the eNB configures (or reconfigures) the MSS to indicate different things e.g. Access Barring. In other words, in these embodiments the additional synchronisation signal is configured to provide the indication of the status of the first communications parameter by default, and the controller circuitry of the infrastructure equipment is configured in combination with the transceiver circuitry of the infrastructure equipment to reconfigure the additional synchronisation signal to provide an indication of the status of one or more others of the plurality of communications parameters, and to provide an indication to the one or more communications devices that the additional synchronisation signal has been reconfigured.

Figure 7:
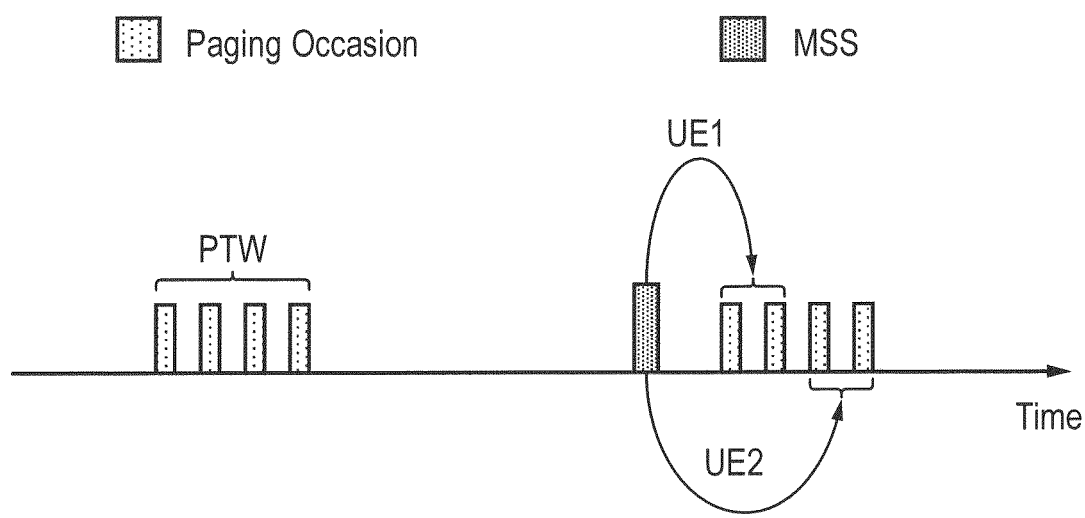
FIG. 7 illustrates an example of an MSS indicating different paging occasion activations for different communications devices in accordance with embodiments of the present technique.

In some arrangements of these embodiments of the present technique, this configuration is signalled via UE specific RRC configuration. Hence it is therefore possible that the same MSS can indicate different things to different UEs. For example, FIG. 7 shows a PTW (Paging Time Window) where in each PTW there are 4 Paging Occasions (PO). The MSS carries 1 information bit and for UE1 it indicates whether the first two POs in a PTW are active or not active (i.e. whether UE needs to monitor them) and for UE2 it indicates whether the last two POs in a PTW are active or not active. Additional UEs can of course be configured such that the indication means different POs, for example a further UE3 can be configured such that the MSS indicates the activation/deactivation of the first two POs in the PTW, similar to UE1 and another UE4 can be configured such that the MSS indicates the activation/deactivation of all the POs in the PTW. It should be appreciated that this is not limited to indication of POs in a PTW but can indicate other things, e.g. a group of UEs can be configured such that the MSS information bit indicates whether SIB14 has changed and another group of UEs can be configured such that the same MSS information bit indicates whether SIB1 has changed. Note that this is more efficient for UEs than a single MSS bit that indicates "either SIB1 or SIB14 has changed". Although some UEs will inadvertently read SIB1 or SIB14, UEs do not inadvertently read both SIB1 and SIB14. In other words, in these arrangements, the controller circuitry of the infrastructure equipment is configured in combination with the transceiver circuitry of the infrastructure equipment to signal the indication that the additional synchronisation signal has been reconfigured to the one or more communications devices via Radio Resource Control configurations specific to each of the one or more communications devices. The additional synchronisation signal may indicate the status of a different communications parameter to different ones of the communications devices.

In some other arrangements of these embodiments of the present technique, the indication is configured by SIB. That is all the UEs will interpret the information carried by the MSS the same way. This does not mean that particular UEs cannot be further configured to monitor a different MSS via RRC signaling.

In other words, in these arrangements, the controller circuitry of the infrastructure equipment is configured in combination with the transceiver circuitry of the infrastructure equipment to signal the indication that the additional synchronisation signal has been reconfigured to the one or more communications devices via system information.

In some further arrangements of these embodiments of the present technique, a subset of MSS information is broadcast in the SIB and another set is RRC configured (UE specific) by the network. For example, MSS has 2 information bits where the configuration of the $1^{st}$ information bit is broadcasted in the SIB to indicate whether MIB/SIB has changed and the $2^{nd}$ bit is RRC configured which can be different for different UEs. In other words, in these arrangements, the controller circuitry of the infrastructure equipment is configured in combination with the transceiver circuitry of the infrastructure equipment to signal a first indication that a first portion of the additional synchronisation signal has been reconfigured to the one or more communications devices via system information, and to signal a second indication that a second portion of the additional synchronisation signal has been reconfigured to the one or more communications devices via Radio Resource Control configurations specific to each of the one or more communications devices.

Although embodiments of the present technique are largely described in relation to MSS as the additional synchronisation signal, those skilled in the art would appreciate that they are equally applicable for other synchronisation signals such as a Wake Up Signal (WUS). In other words, the additional synchronisation signal is a wake-up signal, the wake-up signal providing an indication that one of the communications devices will receive a downlink message from the infrastructure equipment for the one of the communications devices to decode. A description of a WUS can be found in co-pending European patent application no. EP17186065 [9], the contents of which are hereby incorporated by reference. A wake-up signal such as one discussed in [9] may comprise a wake-up signal preamble including a plurality of Orthogonal Frequency Division Multiplexed, OFDM, symbols each being combined with a reference sequence, and one or more of the OFDM symbols being shifted in frequency with respect to one or more of the other OFDM symbols.

Figure 8:
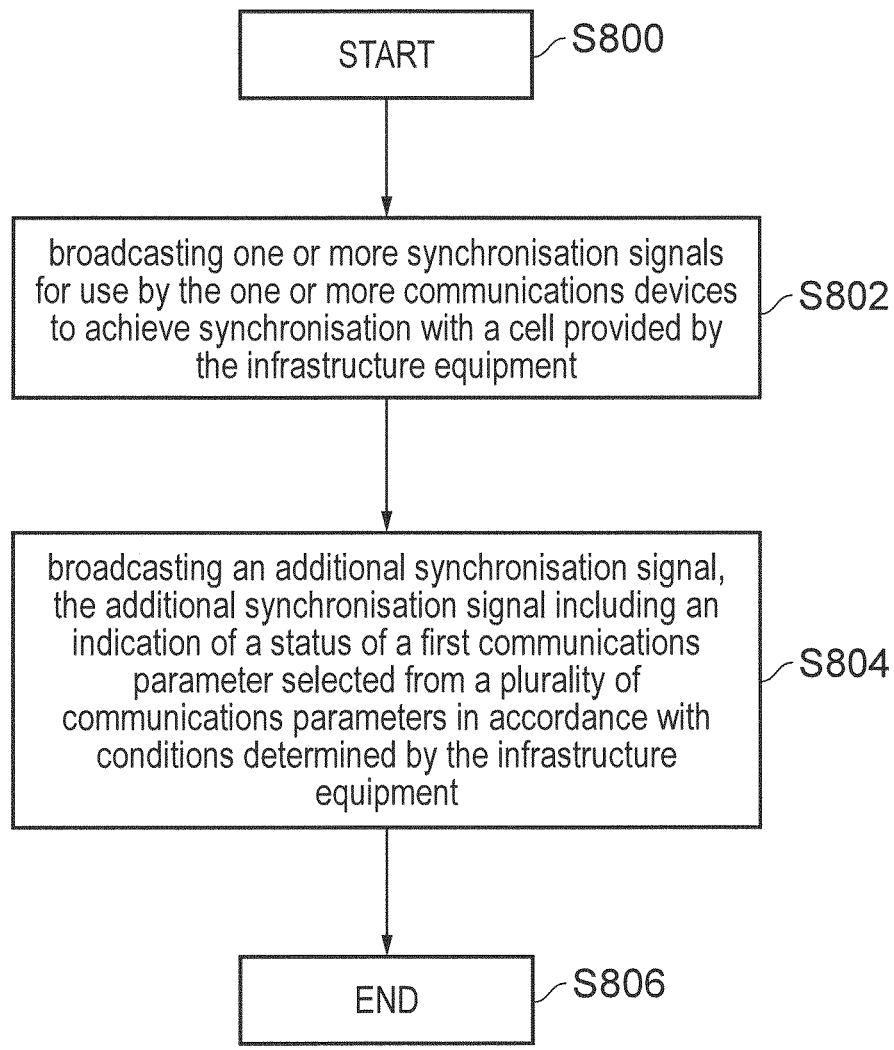
FIG. 8 shows a flow diagram illustrating a process of communications in a communications system in accordance with embodiments of the present technique.

FIG. 8 shows a flow diagram illustrating a process of communications in a communications system comprising an infrastructure equipment and a communications device in accordance with embodiments of the present technique. The process is a method of operating the infrastructure equipment. The process starts in step S800. The method comprises in step S802, broadcasting one or more synchronisation signals for use by the one or more communications devices to achieve synchronisation with a cell provided by the infrastructure equipment. In step S804, the method comprises broadcasting an additional synchronisation signal, the additional synchronisation signal including an indication of a status of a first communications parameter selected from a plurality of communications parameters in accordance with conditions determined by the infrastructure equipment. The process ends in step S806.

As described above, embodiments of the present technique enable an additional synchronisation signal (MSS) to be broadcast by the infrastructure equipment, which can be used to provide a plurality of indications whilst minimising the number of information bits required.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. An infrastructure equipment for use in a wireless communications system comprising the infrastructure equipment and one or more communications devices, wherein the infrastructure equipment comprises controller circuitry and transceiver circuitry which are configured in combination
    to broadcast one or more synchronisation signals for use by the one or more communications devices to achieve synchronisation with a cell provided by the infrastructure equipment, and
    to broadcast an additional synchronisation signal, the additional synchronisation signal including an indication of a status of a first communications parameter selected from a plurality of communications parameters in accordance with conditions determined by the controller circuitry.

Paragraph 2. An infrastructure equipment according to Paragraph 1, wherein the controller circuitry and transceiver circuitry are configured in combination
    to broadcast one or more other additional synchronisation signals providing an indication of the status of one or more other communications parameters selected from the plurality of communications parameters in accordance with conditions determined by the controller circuitry.

Paragraph 3. An infrastructure equipment according to Paragraph 2, wherein the additional synchronisation signal comprises a different number of bits than the one or more other additional synchronisation signals.

Paragraph 4. An infrastructure equipment according to Paragraph 2, wherein the additional synchronisation signal is broadcast for a different amount of time than the one or more other additional synchronisation signals.

Paragraph 5. An infrastructure equipment according to Paragraph 2, wherein the additional synchronisation signal is broadcast in a different narrowband of a wireless access interface provided by the infrastructure equipment to a narrowband in which the one or more other additional synchronisation signals are broadcast.

Paragraph 6. An infrastructure equipment according to any of Paragraphs 1 to 5, wherein the status of the first or the others of the plurality of the communications parameters includes one or more of an indication of a change in system information for the cell provided by the infrastructure equipment, an indication of whether a paging time window comprising a one or more paging occasions during which the one or more communications devices may be paged by the infrastructure equipment is active, and an indication of whether access for the one or more communications is currently barred for the cell.

Paragraph 7. An infrastructure equipment according to any of Paragraphs 1 to 6, wherein the additional synchronisation signal comprises one or more bits, wherein the one or more bits are fewer than a number of bits required to indicate the status of all of the plurality of communications parameters.

Paragraph 8. An infrastructure equipment according to any of Paragraphs 1 to 7, wherein the additional synchronisation signal is for monitoring by a subset of the one or more communications devices.

Paragraph 9. An infrastructure equipment according to any of Paragraphs 1 to 8, wherein the additional synchronisation signal comprises a plurality of bits, a first portion of the plurality of bits being fixed to indicate the status of the first of the communications parameters, and a second portion of the plurality of bits being configurable by the infrastructure equipment to indicate the status of one or more others of the plurality of communications parameters.

Paragraph 10. An infrastructure equipment according to any of Paragraphs 1 to 9, wherein the additional synchronisation signal is configured to provide the indication of the status of the first communications parameter by default, and the controller circuitry is configured in combination with the transceiver circuitry
  to reconfigure the additional synchronisation signal to provide an indication of the status of one or more others of the plurality of communications parameters, and
  to provide an indication to the one or more communications devices that the additional synchronisation signal has been reconfigured.

Paragraph 11. An infrastructure equipment according to Paragraph 10, wherein the controller circuitry is configured in combination with the transceiver circuitry
  to signal the indication that the additional synchronisation signal has been reconfigured to the one or more communications devices via system information.

Paragraph 12. An infrastructure equipment according to Paragraph 10, wherein the controller circuitry is configured in combination with the transceiver circuitry
  to signal the indication that the additional synchronisation signal has been reconfigured to the one or more communications devices via Radio Resource Control configurations specific to each of the one or more communications devices.

Paragraph 13. An infrastructure equipment according to Paragraph 12, wherein the additional synchronisation signal indicates the status of a different communications parameter to different ones of the communications devices.

Paragraph 14. An infrastructure equipment according to Paragraph 10, wherein the controller circuitry is configured in combination with the transceiver circuitry
  to signal a first indication that a first portion of the additional synchronisation signal has been reconfigured to the one or more communications devices via system information, and
  to signal a second indication that a second portion of the additional synchronisation signal has been reconfigured to the one or more communications devices via Radio Resource Control configurations specific to each of the one or more communications devices.

Paragraph 15. An infrastructure equipment according to any of Paragraphs 1 to 14, wherein the additional synchronisation signal is a wake-up signal, the wake-up signal providing an indication that one of the communications devices will receive a downlink message from the infrastructure equipment for the one of the communications devices to decode.

Paragraph 16. A method of operating an infrastructure equipment in a wireless communications system comprising the infrastructure equipment and one or more communications devices, the method comprising
  broadcasting one or more synchronisation signals for use by the one or more communications devices to achieve synchronisation with a cell provided by the infrastructure equipment, and
  broadcasting an additional synchronisation signal, the additional synchronisation signal including an indication of a status of a first communications parameter selected from a plurality of communications parameters in accordance with conditions determined by the infrastructure equipment.

Paragraph 17. Circuitry for an infrastructure equipment for use in a wireless communications system comprising the infrastructure equipment and one or more communications devices, wherein the infrastructure equipment comprises controller circuitry and transceiver circuitry which are configured in combination
  to broadcast one or more synchronisation signals for use by the one or more communications devices to achieve synchronisation with a cell provided by the infrastructure equipment, and
  to broadcast an additional synchronisation signal, the additional synchronisation signal including an indication of a status of a first communications parameter selected from a plurality of communications parameters in accordance with conditions determined by the controller circuitry.

Paragraph 18. A wireless communications system comprising an infrastructure equipment and one or more communications devices, wherein the infrastructure equipment comprises controller circuitry and transceiver circuitry which are configured in combination
  to broadcast one or more synchronisation signals for use by the one or more communications devices to achieve synchronisation with a cell provided by the infrastructure equipment, and
  to broadcast an additional synchronisation signal, the additional synchronisation signal including an indication of a status of a first communications parameter selected from a plurality of communications parameters in accordance with conditions determined by the controller circuitry.

Paragraph 19. A communications device for use in a wireless communications system comprising an infrastructure equipment and the communications device, wherein the communications device comprises controller circuitry and transceiver circuitry which are configured in combination
  to receive a first broadcast from the infrastructure equipment comprising one or more synchronisation signals for use by the communications device to achieve synchronisation with a cell provided by the infrastructure equipment,
  to receive a second broadcast from the infrastructure equipment comprising an additional synchronisation signal, the additional synchronisation signal including an indication of a status of a first communications parameter selected from a plurality of communications parameters in accordance with conditions determined by the infrastructure equipment, and to determine, based on the received additional synchronisation signal, the status of the communications parameter.

Paragraph 20. A method of operating a communications device in a wireless communications system comprising an infrastructure equipment and the communications device, the method comprising receiving a first broadcast from the infrastructure equipment comprising one or more synchronisation signals for use by the communications device to achieve synchronisation with a cell provided by the infrastructure equipment, receiving a second broadcast from the infrastructure equipment comprising an additional synchronisation signal, the additional synchronisation signal including an indication of a status of a first communications parameter selected from a plurality of communications parameters in accordance with conditions determined by the infrastructure equipment, and determining, based on the received additional synchronisation signal, the status of the communications parameter.

Paragraph 21. Circuitry for a communications device for use in a wireless communications system comprising an infrastructure equipment and the communications device, wherein the communications device comprises controller circuitry and transceiver circuitry which are configured in combination to receive a first broadcast from the infrastructure equipment comprising one or more synchronisation signals for use by the communications device to achieve synchronisation with a cell provided by the infrastructure equipment, to receive a second broadcast from the infrastructure equipment comprising an additional synchronisation signal, the additional synchronisation signal including an indication of a status of a first communications parameter selected from a plurality of communications parameters in accordance with conditions determined by the infrastructure equipment, and to determine, based on the received additional synchronisation signal, the status of the communications parameter.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170732, "New WID on Even further enhanced MTC for LTE," Ericsson, Qualcomm, 3GPP TSG RAN Meeting #75, Dubrovnik, Croatia, Mar. 6-9, 2017.

[4] RP-170852, "New WID on Further NB-IoT enhancements," Huawei, HiSilicon, Neul, 3GPP TSG RAN Meeting #75, Dubrovnik, Croatia, Mar. 6-9, 2017.

[5] Holma H. and Toskala A, "LTE for UMTS OFDMA and SC-FDMA based radio access", John Wiley and Sons, 2009.

[6] White Paper "Coverage Analysis of LTE-M Category-M1" Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2016.

[7] R1-1716995, "Reduced System Acquisition Time for MTC," Ericsson 3GPP TSG-RAN WG1 Meeting #90bis, Prague, Czech Republic, Oct. 9-13, 2017.

[8] European patent application no. EP17169821.

[9] European patent application no. EP17186065.

What is claimed is:

1. An infrastructure equipment for use in a wireless communications system comprising the infrastructure equipment and one or more communications devices, wherein the infrastructure equipment comprises controller circuitry and transceiver circuitry which are configured in combination to broadcast one or more synchronisation signals for use by the one or more communications devices to achieve synchronisation with a cell provided by the infrastructure equipment, and to broadcast an additional synchronisation signal, the additional synchronisation signal including an indication of a status of a first communications parameter selected from a plurality of communications parameters in accordance with conditions determined by the controller circuitry, wherein the additional synchronisation signal comprises a plurality of bits, wherein a first portion of the plurality of bits is fixed to indicate the status of the first of the communication parameters, and a second portion of the plurality of bits is configurable by the infrastructure equipment to indicate the status of one or more others of the plurality of communication parameters.

2. The infrastructure equipment according to claim 1, wherein the controller circuitry and transceiver circuitry are configured in combination to broadcast one or more other additional synchronisation signals providing an indication of the status of one or more other communications parameters selected from the plurality of communications parameters in accordance with conditions determined by the controller circuitry.

3. The infrastructure equipment according to claim 2, wherein the additional synchronisation signal comprises a different number of bits than the one or more other additional synchronisation signals.

4. The infrastructure equipment according to claim 2, wherein the additional synchronisation signal is broadcast for a different amount of time than the one or more other additional synchronisation signals.

5. The infrastructure equipment according to claim 2, wherein the additional synchronisation signal is broadcast in a different narrowband of a wireless access interface provided by the infrastructure equipment to a narrowband in which the one or more other additional synchronisation signals are broadcast.

6. The infrastructure equipment according to claim 1, wherein the status of the first or the others of the plurality of the communications parameters includes one or more of an indication of a change in system information for the cell provided by the infrastructure equipment, an indication of whether a paging time window comprising a one or more paging occasions during which the one or more communications devices may be paged by the infrastructure equipment is active, and an indication of whether access for the one or more communications is currently barred for the cell.

7. The infrastructure equipment according to claim 1, wherein the additional synchronisation signal comprises one or more bits, wherein the one or more bits are fewer than a number of bits required to indicate the status of all of the plurality of communications parameters.

8. The infrastructure equipment according to claim 1, wherein the additional synchronisation signal is for monitoring by a subset of the one or more communications devices.

9. The infrastructure equipment according to claim 1, wherein the additional synchronisation signal is configured to provide the indication of the status of the first communications parameter by default, and the controller circuitry is configured in combination with the transceiver circuitry
   to reconfigure the additional synchronisation signal to provide an indication of the status of one or more others of the plurality of communications parameters, and
   to provide an indication to the one or more communications devices that the additional synchronisation signal has been reconfigured.

10. The infrastructure equipment according to claim 9, wherein the controller circuitry is configured in combination with the transceiver circuitry
   to signal the indication that the additional synchronisation signal has been reconfigured to the one or more communications devices via system information.

11. The infrastructure equipment according to claim 9, wherein the controller circuitry is configured in combination with the transceiver circuitry
   to signal the indication that the additional synchronisation signal has been reconfigured to the one or more communications devices via Radio Resource Control configurations specific to each of the one or more communications devices.

12. The infrastructure equipment according to claim 11, wherein the additional synchronisation signal indicates the status of a different communications parameter to different ones of the communications devices.

13. The infrastructure equipment according to claim 9, wherein the controller circuitry is configured in combination with the transceiver circuitry
   to signal a first indication that a first portion of the additional synchronisation signal has been reconfigured to the one or more communications devices via system information, and
   to signal a second indication that a second portion of the additional synchronisation signal has been reconfigured to the one or more communications devices via Radio Resource Control configurations specific to each of the one or more communications devices.

14. The infrastructure equipment according to claim 1, wherein the additional synchronisation signal is a wake-up signal, the wake-up signal providing an indication that one of the communications devices will receive a downlink message from the infrastructure equipment for the one of the communications devices to decode.

15. A method of operating an infrastructure equipment in a wireless communications system comprising the infrastructure equipment and one or more communications devices, the method comprising
   broadcasting one or more synchronisation signals for use by the one or more communications devices to achieve synchronisation with a cell provided by the infrastructure equipment, and
   broadcasting an additional synchronisation signal, the additional synchronisation signal including an indication of a status of a first communications parameter selected from a plurality of communications parameters in accordance with conditions determined by the infrastructure equipment,
   wherein the additional synchronisation signal comprises a plurality of bits, wherein a first portion of the plurality of bits is fixed to indicate the status of the first of the communication parameters, and a second portion of the plurality of bits is configurable by the infrastructure equipment to indicate the status of one or more others of the plurality of communication parameters.

16. A communications device for use in a wireless communications system comprising an infrastructure equipment and the communications device, wherein the communications device comprises controller circuitry and transceiver circuitry which are configured in combination
   to receive a first broadcast from the infrastructure equipment comprising one or more synchronisation signals for use by the communications device to achieve synchronisation with a cell provided by the infrastructure equipment,
   to receive a second broadcast from the infrastructure equipment comprising an additional synchronisation signal, the additional synchronisation signal including an indication of a status of a first communications parameter selected from a plurality of communications para cars in accordance with conditions determined by the infrastructure equipment, wherein the additional synchronisation signal comprises a plurality of bits, wherein a first portion of the plurality of bits is fixed to indicate the status of the first of the communication parameters, and a second portion of the plurality of bits is configurable by the infrastructure equipment to indicate the status of one or more others of the plurality of communication parameters, and
   to determine, based on the received additional synchronisation signal, the status of the communications parameter.

* * * * *